United States Patent
Barriga et al.

(10) Patent No.: US 9,088,602 B2
(45) Date of Patent: Jul. 21, 2015

(54) METHOD AND ARRANGEMENT FOR DETECTING FRAUD IN TELECOMMUNICATION NETWORKS

(75) Inventors: Luis Barriga, Bandhagen (SE); Michael Liljenstam, Solna (SE); Alessandro Mordacci, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 182 days.

(21) Appl. No.: 13/391,486

(22) PCT Filed: Aug. 25, 2009

(86) PCT No.: PCT/SE2009/050952
§ 371 (c)(1),
(2), (4) Date: Feb. 21, 2012

(87) PCT Pub. No.: WO2011/025420
PCT Pub. Date: Mar. 3, 2011

(65) Prior Publication Data
US 2012/0159632 A1  Jun. 21, 2012

(51) Int. Cl.
*H04L 29/06* (2006.01)

(52) U.S. Cl.
CPC .................................. *H04L 63/1416* (2013.01)

(58) Field of Classification Search
CPC ............................. H04L 63/1416; H04L 63/14
USPC ........................................ 726/24, 30; 705/67
See application file for complete search history.

(56) References Cited

U.S. PATENT DOCUMENTS

| | | | |
|---|---|---|---|
| 7,752,665 B1 * | 7/2010 | Robertson et al. ............... 726/23 |
| 7,962,616 B2 * | 6/2011 | Kupferman et al. .......... 709/225 |
| 7,971,237 B2 * | 6/2011 | Caslin et al. ..................... 726/7 |
| 8,666,841 B1 * | 3/2014 | Claridge et al. ........... 705/26.35 |
| 2002/0133721 A1 * | 9/2002 | Adjaoute ...................... 713/201 |
| 2003/0154406 A1 * | 8/2003 | Honarvar et al. ............. 713/201 |
| 2004/0111305 A1 | 6/2004 | Gavan et al. |
| 2005/0091524 A1 * | 4/2005 | Abe et al. ...................... 713/200 |
| 2005/0160280 A1 * | 7/2005 | Caslin et al. .................. 713/189 |
| 2005/0273442 A1 * | 12/2005 | Bennett et al. .................. 705/67 |

(Continued)

FOREIGN PATENT DOCUMENTS

| JP | 2009130664 A | 6/2009 |
|---|---|---|
| WO | 0177960 A2 | 10/2001 |

OTHER PUBLICATIONS

Sibai, "Countering Network-Centric Insider Threats through Sel-Protection Autonomic Rule Generation", 2012, IEEE, p. 273-282.*

*Primary Examiner* — Thanhnga B Truong
*Assistant Examiner* — Gregory Lane
(74) *Attorney, Agent, or Firm* — Coats & Bennett, P.L.L.C.

(57) ABSTRACT

Method and arrangement in a mediating function (204) for supporting detection of fraud in a network, when a network security function (200) is employed for analyzing activities in the network in view of predefined alert criteria, and a fraud detection function (202) is employed for analyzing e.g. charging information of users. When a first alert is received from a first one of the network security function and the fraud detection function, indicating that the predefined alert criteria of said first function have been satisfied, the alert criteria of the second one of said network security function and fraud detection function are modified based on the received first alert. Thereby, the network security and fraud detection functions can be correlated and made more efficient regarding accuracy and/or speed in detecting fraud.

20 Claims, 4 Drawing Sheets

(56) References Cited

U.S. PATENT DOCUMENTS

| | | | |
|---|---|---|---|
| 2007/0220615 A1* | 9/2007 | Ogawa | 726/30 |
| 2008/0201464 A1 | 8/2008 | Campbell et al. | |
| 2008/0253380 A1* | 10/2008 | Cazares et al. | 370/395.53 |
| 2008/0288382 A1* | 11/2008 | Smith et al. | 705/35 |
| 2008/0288427 A1* | 11/2008 | Barson et al. | 706/25 |
| 2009/0025084 A1* | 1/2009 | Siourthas et al. | 726/25 |
| 2009/0094669 A1* | 4/2009 | Savadi et al. | 726/1 |
| 2009/0210444 A1* | 8/2009 | Bailey et al. | 707/103 R |

\* cited by examiner

METHOD AND ARRANGEMENT FOR DETECTING FRAUD IN TELECOMMUNICATION NETWORKS

TECHNICAL FIELD

The invention relates generally to a method and arrangement for supporting detection of fraud directed against users in a telecommunication network.

BACKGROUND

In recent years, the advent of a multitude of advanced techniques and tools for telecommunication has unfortunately also entailed the substantial risk of being subject to fraud when communicating over public telecommunication networks such as the Internet. Illicit parties conceive ever more sophisticated methods of stealing money from Internet users, e.g., by unallowably obtaining credit card information or login credentials for online banking operations. Other common methods of fraud attacks in such networks exploit various charging mechanisms in the networks, e.g., relating to so-called premium services, typically when the Internet is accessed over a telecommunication network.

One example of fraud is to incite a call or SMS (Short Message Service) message from a terminal user to a premium service, which triggers automatic transaction of a small sum from the user's subscription account to an account of the fraudster, without the user even noticing. Another example is to offer media or software for downloading which contains a hidden computer program which, when installed in a user terminal, operates to somehow transfer money from the user's account to the fraudster's account, e.g. by automatically sending SMS messages causing minor money transactions as described above. Such malicious computer programs are referred to as "malware" and can thus be installed in a user terminal without the user noticing. Hence, a fraudster inside or outside the network may, by means of malware or otherwise, manipulate the user's terminal and/or the operator's charging mechanism to steal money from the user.

As a result, various defense mechanisms have been developed attempting to discover network-based fraud attacks against user terminals in the network. Today, different firewalls, spam filters and malware protection mechanisms are typically used in network nodes and terminals. There are also some more sophisticated mechanisms in the networks for fraud detection which are based on the recognition of previously known fraud attacks, e.g. by recognising signatures, messages, signalling patterns, communication with web sites and servers known to be associated with criminal activities, and so forth. Moreover, network operators use fraud detection tools that can recognise abnormal charging patterns possibly associated with fraudulent activities.

FIG. 1 illustrates how a telecommunication network, e.g. a mobile network, can employ different security systems for detecting attacks potentially related to fraud, according to current solutions. A network security function 100 receives information on traffic in the network which is analysed, e.g. using so-called "Deep Packet Inspection", with respect to potential attacks such as malware, spam, communication with notorious web sites, etc. The network security function 100 may also receive information on activities in terminals in the network. To obtain the above information, the network security function 100 may utilise sensors or the like placed in network nodes and/or in the user terminals.

Alternatively or additionally, a fraud detection function 102 analyses information on the network operator's charging of subscribers and users in the network, based on charging information obtained from a charging system 104 of the network, in order to detect any abnormalities in charging patterns for one or more users that might indicate fraud. For example, the fraud detection function 102 may react when a great number of money transactions to a certain account suddenly occur, or when money is transferred to an account that can be traced to a notorious or suspect party. As indicated in the figure, an alarm or the like may be generated from the security functions 100, 102 if a network attack or fraud activity, respectively, is detected. However, fraudsters are constantly getting more skilled in making network attacks and fraud that go unnoticed by the security systems above.

Apart from the obvious nuisance to the users when subject to fraud attacks, the network operators also find it troublesome that their subscribers in the network are defrauded of money, particularly when the operator's charging mechanisms are exploited by the fraudsters. This may result in monetary losses also for the operator, as well as customer complaints and general distrust in the operator for not being capable of suppressing the fraudulent activities in their networks.

SUMMARY

It is an object of the invention to basically address at least some of the problems outlined above. Further, it is an object to support or facilitate the detection of fraud in order to enable suppression of the fraud attacks in a telecommunication network. These objects and others may be obtained by providing a method and arrangement according to the independent claims attached below.

According to one aspect, a method is provided in a mediating function to support detection of fraud in a telecommunication network. In this method, a network security function is employed for analysing traffic and terminal activities in the network in view of predefined alert criteria for detecting network and terminal attacks, and a fraud detection function is employed for analysing information on users in the network, including charging information, in view of predefined alert criteria for detecting fraud attacks. The mediating function monitors both of the above network security and fraud detection functions. When a first alert is received from a first one of the network security function and the fraud detection function, which alert indicates that the predefined alert criteria of the first function have been satisfied, the alert criteria of the second one of the network security function and fraud detection function, is modified based on the received first alert.

According to another aspect, an arrangement is provided in a mediating function, which is basically configured to support detection of fraud in a telecommunication network as of the method above. This inventive mediating function arrangement comprises a monitoring unit adapted to monitor the network security function and fraud detection function. The monitoring unit is further adapted to receive a first alert from a first one of the network security function and the fraud detection function, which alert indicates that the predefined alert criteria of the first function have been satisfied. The mediating function arrangement also comprises a modifying unit adapted to modify the alert criteria of the second one of the network security function and fraud detection function, based on the received alert.

When using the method and arrangement above, the operation of the network security function can be correlated with that of the fraud detection function, and vice versa, depending on the output of alerts from these functions. Any serious fraud attempts can therefore be discovered more efficiently and sooner, as compared with the conventional non-correlated security functions.

Different embodiments are possible in the method and arrangement above.

In one embodiment, the alert criteria are modified by setting a new detection rule for the second function, which rule may be set by changing an existing detection rule in the alert criteria of the second function. If the second function is the network security function, the new detection rule could dictate that an alert is issued upon detection of any of: malware, spam, and communication with a notorious or suspect party or web site. On the other hand, if the second function is the fraud detection function, the new detection rule could dictate that an alert is issued upon detection of an abnormality in the charging pattern for one or more terminal users in the telecommunication network. In the latter case, the mediating function may evaluate the first alert from the network security function by checking known network threats in a threat database in which information on such known threats has been stored.

In further possible embodiments, a new detection rule could dictate that an alert is issued upon detection of any activity related to a suspect service. A new detection rule may also be valid for a preset period of time, after which the previous alert criteria are resumed, and/or for one or more specific terminal users.

If the mediating function receives a second alert from the second function, indicating that the modified alert criteria of the second function have been satisfied, the alert criteria of the first function may also be modified based on the received second alert. The process of modifying alert criteria for the first and second functions based on such alerts may be repeated to and fro, in order to increasingly improve the ability of discovering fraud attempts.

In another possible embodiment, the mediating function issues an alarm in response to one or more further alerts from either of the network security function and the fraud detection function. In practice, one or more of the mediating, network security and fraud detection functions could be implemented in at least one network node or in at least one user terminal.

Further possible features and benefits of the invention will be explained in the detailed description below.

BRIEF DESCRIPTION OF THE DRAWINGS

The invention will now be explained in more detail by means of exemplary embodiments and with reference to the accompanying drawings, in which.

DETAILED DESCRIPTION

Briefly described, it is recognised that the efficiency and accuracy of the network security function and the fraud detection function described above greatly depends on how the conditions for issuing alerts or alarms is defined, in this description referred to as "alert criteria". In this solution, either of these security functions can be controlled in a dynamic manner by actively setting conditions or detection rules, i.e. criteria, for issuing alerts therefrom depending on alerts issued from the opposite function.

Thereby, the operation of one function will be correlated with the findings and output of alerts from the other function, and vice versa, such that any serious network or terminal attacks or fraud attempts can be discovered in a more efficient manner and also sooner at a relatively early stage, as compared with the conventional non-correlated security functions. Even though the term "alert criteria" is used throughout in the plural form for simplicity, it may represent any number of rules and/or conditions including just a single rule or condition in some cases, depending on the implementation.

Figure 1:
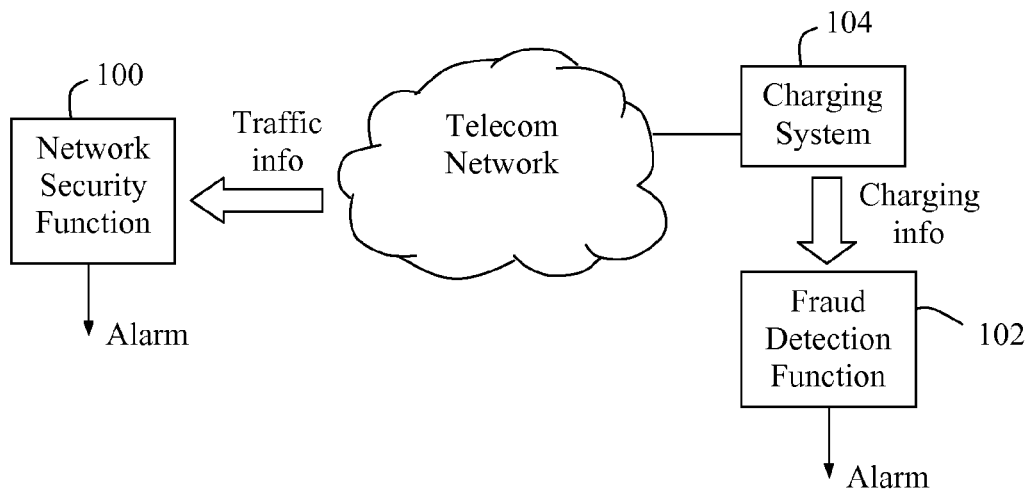
FIG. 1 is a schematic block diagram illustrating how fraud can be detected in a telecommunication network, according to the prior art.
Figure 2:
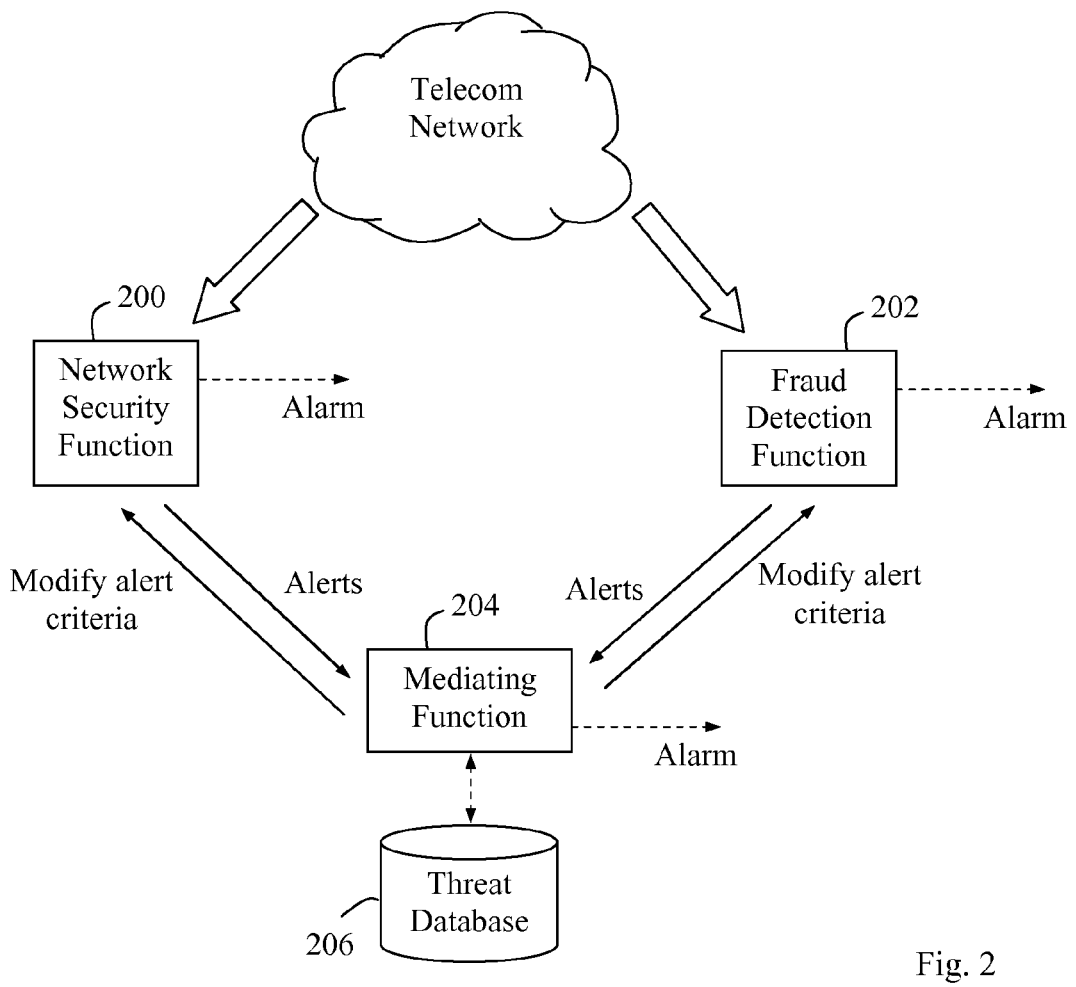
FIG. 2 is a schematic block diagram illustrating how fraud can be detected more efficiently by means of a mediating function, in accordance with one possible embodiment.

FIG. 2 illustrates a scenario in which this solution is used and where a network security function 200 and a fraud detection function 202 operate to survey a telecommunication network in view of attacks and fraud basically as described above. The functions 200 and 202 may operate to issue alarms, as indicated by dashed arrows therefrom, when certain monitored parameters or situations fulfill certain criteria, e.g. according to more or less regular procedures. These alarms are traditionally intended to be observed by some personnel responsible for security in the network. Typically, the network security and fraud detection functions are implemented in suitable nodes of the surveyed network, but one or two of these functions could also reside in a user terminal.

In this solution, a new functionality named a "mediating function" 204 is introduced to provide correlation between the two existing functions 200 and 202 so they can operate more efficiently in terms of accuracy and/or speed, to be described in more detail below. Alternatively, the mediating function 204 could be named otherwise, e.g. a correlating, linking or controlling function or unit.

The mediating function 204 is connected to both the network security function 200 and the fraud detection function 202, as shown in the figure. The network security function 200 basically analyses information on traffic and terminal activities in the network in view of predefined alert criteria for detecting network and terminal attacks, and sends alerts to the mediating function 204 whenever the predefined alert criteria is satisfied.

Further, the fraud detection function 202 basically analyses charging information and possibly other information on users in the network, in view of other predefined alert criteria for detecting fraud attacks. Accordingly, function 202 also sends alerts to the mediating function 204 whenever the predefined alert criteria of function 202 are satisfied. The information thus analysed by the network security and fraud detection functions 200, 202 can be regarded as "low-level" and "high-level" information, respectively, the latter being typically the so-called application-level.

The mediating function 204 thus monitors both the network security and fraud detection functions 200, 202 to detect alerts therefrom. These alerts may thus indicate an attack on the network and/or terminals therein, or a suspected fraud activity, which can generally be referred to as a "threat", which may be either known from before or just suspected. The mediating function 204 may also check a so-called "threat database" 206 in which previously known threats related to different network and terminal attacks are stored. If an alert is received from either function 200, 202 concerning a suspected threat, it can be compared to the known threats in database 206. If a match is found, further information on the threat can be retrieved from database 206. In this way, it can be determined if alerts for network attacks have previously been analysed and found to be associated with attempted fraud. For example, the analysis of malware code could indicate that a specific malware, as identified by signature or the like, attempts to perform SMS fraud.

When the mediating function 204 receives an alert from either the network security function 200 or the fraud detection function 202, indicating that the predefined alert criteria of that function have been satisfied, it modifies, or "updates", the alert criteria of the other one of the network security and fraud detection functions, based on the received alert. The conditions for issuing alerts is thus changed for the other function in consideration of what has been detected by the first function, as implied by the alert therefrom. This procedure may basically be repeated whenever an alert is received from either function 200, 202.

Thereby, the network security and fraud detection functions can be made more efficient regarding accuracy and/or speed in detecting fraud or suspected fraud, by correlating their operations to one another in the manner described here. It should be noted that the mediating function may also issue an alarm aimed at some personnel responsible for security in the network, and separate conditions may be set for issuing such an alarm from the mediating function in a similar manner as from the network security and fraud detection functions. For example, such an alarm condition may be reception of a preset number of alerts from these functions.

The above correlation of the network security function 200 and the fraud detection function 202 can be made in several different ways depending on the situation. Basically, when receiving an alert from one of functions 200, 202 concerning a certain user or service, the alert criteria of the opposite function 202 or 200 can be modified to become more sensitive to certain activities concerning that user or service, and trigger an alert sooner than before.

For example, if an alert from the fraud detection function 202 implies that the number of money transactions from a certain user to a certain account has exceeded a preset limit during a preset time period, the mediating function 204 modifies the alert criteria for that user or service in the network security function 200 to issue an alert sooner. This may be done e.g. when the user or service is detected to be involved with a certain "suspect" activity, such as so-called "Trojan activity" involving illicitly installed malware that automatically generates traffic from the terminal used. The alert criteria may also be modified to enable targeted detailed traffic capture for legal analysis, if possible. Some further practical examples of using the present solution will be described in more detail later below. The term "suspect" is used here to indicate something that can be regarded as potentially associated with fraud or other illicit activity.

In this description, modifying alert criteria may include changing an alert triggering threshold for a measured parameter, or introducing a new parameter to be measured with respect to some predefined threshold. Alternatively or additionally, it may also include adding an altogether new alert triggering condition in the alert criteria, such as detection of a certain situation e.g. involving a notorious web site or party, or certain types of traffic (e.g., binary downloads) disguised as other types of traffic. These exemplary conditions may not constitute strong enough indicators on their own, or may relate to detection operations that are too costly to perform without previous indications.

Figure 3:
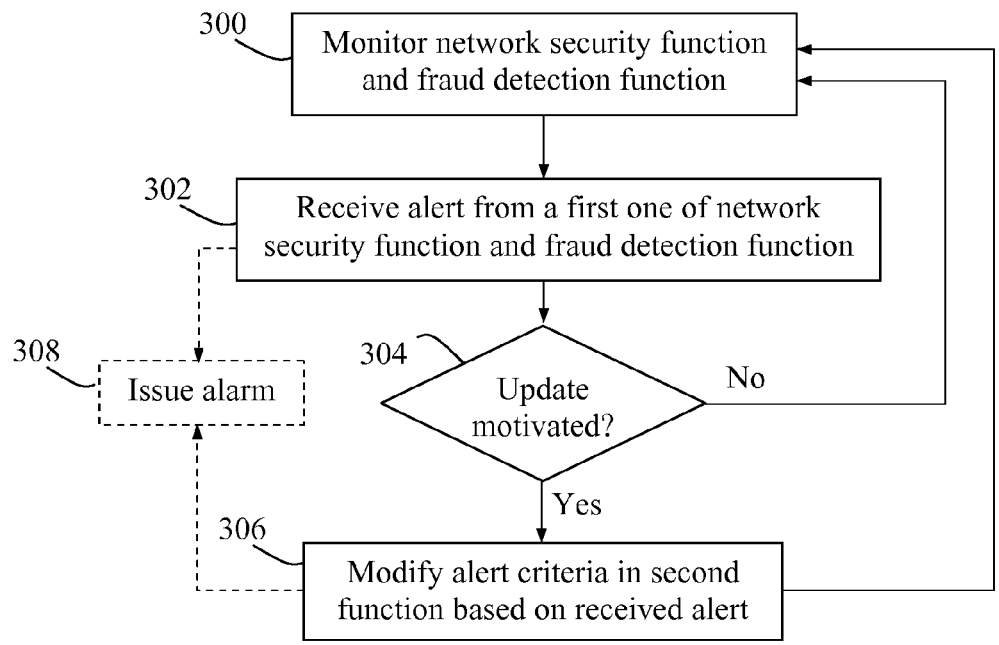
FIG. 3 is a flow chart illustrating a procedure executed by a mediating function for supporting detection of fraud, in accordance with another embodiment.

FIG. 3 is a flow chart with steps in a procedure for supporting detection of fraud in a telecommunication network. As in the case of FIG. 2, it is assumed that a network security function is employed that analyses traffic and terminal activities in the network in view of predefined alert criteria for detecting network and terminal attacks. The term "terminal activities" may refer to any type of communicating terminals that may occur in the network, including mobile and fixed devices, hosts in computers, etc. It is also assumed that a fraud detection function is employed that analyses information on users in the network, at least including charging information, in view of predefined alert criteria for detecting fraud attacks. Also signalling information may be analysed by the fraud detection function in view of fraud related activities.

The network security and fraud detection functions above may collect information on the network and its users by means of a plurality of different sources, such as sensors in various network nodes, user terminals, firewalls, and so forth, which is however somewhat outside the scope of this invention. The following steps are executed in a mediating function connected to both the network security and fraud detection functions above, as similar to the example in FIG. 2.

A first step 300 illustrates that the network security and fraud detection functions are monitored in view of alerts from any of these functions, which is basically made on a more or less continuous basis. In a next step 302, a first alert is received from a first one of the network security function and the fraud detection function. The received alert indicates that the predefined alert criteria of the first function have been satisfied.

In a following optional step 304, it may be determined whether the received first alert motivates an update of the alert criteria for the second one of the network security function and fraud detection function. The mediating function may thus comprise a suitable logic that is capable of analysing any received alerts in order to decide whether such an update is motivated or not. If so, the alert criteria for that second function are modified based on the received first alert, in a further step 306. If no modification is motivated in step 304 by the received alert, the procedure from step 300 onwards may be repeated as described above.

Further, an alarm aimed at some personnel responsible for security in the network may be issued by the mediating function, either right after the alert in step 302 or after modifying the alert criteria step 306, as indicated by an optional step 308. Separate conditions may be set for issuing such an alarm, as mentioned above. In step 306, the alert criteria may be modified by setting a new detection rule for the second function for detecting an attack threat, which rule may be set by changing an existing detection rule in the alert criteria of the second function.

For example, if the second function above is the network security function, the new detection rule could dictate that an alert is issued upon detection of any of: malware, spam, and communication with a notorious or suspect party or web site. On the other hand, if the second function is the fraud detection function, the new detection rule could dictate that an alert is issued upon detection of an abnormality in the charging pattern for one or more terminal users in the network. In the latter case, the first alert received from the network security function may be evaluated by checking known network threats in a threat database. Further, the new detection rule may dictate that an alert is issued upon detection of any activity related to a suspect service. The new detection rule may be valid for one or more specific terminal users. The new detection rule may also be valid for a preset period of time, after which the previous alert criteria are resumed.

After modifying the alert criteria of the second function in step 306, the procedure may be repeated from step 300 onwards. For example, a second alert may then be received from the second function, indicating that the modified alert criteria of the second function have been satisfied. In response thereto, the alert criteria of the first function may be modified based on the received second alert. The procedure may then continue such that a series of alert criteria modifications are made to and fro for the network security and fraud detection functions.

An alarm may be issued by the mediating function in response to one or more further alerts from either of the network security function and the fraud detection function. In practice, the mediating function can be implemented in a single node or be divided into two different nodes for communicating with the network security function and the fraud detection function, respectively. The mediating function can thus be implemented in at least one network node or in at least one user terminal. Alternatively, the mediating function may be practically distributed in two parts: one part residing in the network security function and another part residing in the fraud detection function. In further possible implementations, any of the network security and fraud detection functions could also reside in either a network node or in a user terminal. Regardless of which practical implementation is used, the functions above can operate according to this description.

An exemplary procedure for supporting detection of fraud will now be described with reference to the first signalling diagram in FIG. 4 involving a network security function 400, a fraud detection function 402, a mediating function 404 and a threat database 406, as similar to the example shown in FIG. 2. Thus, both functions 400 and 402 have respective predefined alert criteria with one or more detection rules configured to trigger alerts to the mediation function 404 when satisfied. This procedure may be used, e.g., when many user devices are infected with a piece of malware that, once installed, sends a small number of SMS messages to a predefined number according to a premium service. The defrauder can then collect the money generated from a large number of such premium SMS messages by many infected devices.

Initial parallel steps 4:1a and 4:1b generally illustrate that mediating function 404 monitors the above functions 400 and 402 in view of any alerts therefrom, which may go on continuously in the background during the shown procedure. In a next shown step 4:2, the mediating function 404 receives a first alert from the network security function 400, indicating an observed network attack threat T involving a terminal used by a particular subscriber S, since the predefined alert criteria of function 400 have been satisfied.

If the received alert refers to a specific identified threat T, the mediating function 404 checks the threat database 406, in a further step 4:3, to retrieve further information on the threat T, e.g. to find out whether the threat relates to fraud or other types of illicit activity, such as sending of spam. Otherwise, the threat can be considered to be a "suspected" threat. A following step 4:4 illustrates that a logic in the mediating function 404 analyses and evaluates the threat T, based on the outcome of step 4:3 among other things, to see if a new detection rule is motivated regarding the subscriber S for the opposite fraud detection function 402.

In this example, the threat motivates a particular new detection rule for function 402 to monitor transactions for the subscriber S, according to the mediating logic, and the new detection rule is set for function 402 according to step 4:5. The new detection rule may involve adding an extra rule to the alert criteria, or modifying a threshold condition or the like in an already existing rule in the alert criteria of the fraud detection function 402.

In due course, the mediating function 404 receives a second alert in a step 4:6, this time coming from the fraud detection function 402 and indicating a suspected fraud attack F related to the subscriber S above when using a particular service P, since the previously modified alert criteria in function 402 have been satisfied according to the new detection rule set in step 4:5.

In this example, the mediating function 404 then issues an alarm for suspected subscriber fraud related to service S, in a next step 4:7, e.g. aimed at some security personnel of the network, in response to the alert of step 4:6. This alarm thus signals that a network attack is correlated with a subsequent fraud attack on the subscriber S when using the service P. Thus, the alarm of step 4:7 can be provided sooner and with greater accuracy and sensitivity, as compared to not modifying the alert criteria as of step 4:5.

At this stage, it is further possible again to modify any of the alert criteria in function 400 and 402, by setting a new rule therein as shown in optional steps 4:8 and 4:9, respectively. For example, a new rule for the fraud detection function 402 may be that all transactions related to service P shall trigger an alert, while a new rule for the network security function 400 may be set to extend the monitoring with higher sensitivity for more terminals or subscribers, or generally make it even more sensitive to attacks and threats.

Another exemplary procedure for supporting detection of fraud will now be described with reference to the second signalling diagram in FIG. 5 involving the same nodes as in FIG. 4. Initial steps 5:1a and 5:1b illustrate basically the same monitoring process as of steps 4:1a and 4:1b above. This time, the mediating function 404 first receives an alert from the fraud detection function 402 for a suspected fraud attack F on a particular subscriber S when using a particular service P, in a step 5:2. Hence, the alert criteria of function 402 have evidently been satisfied.

The mediating function 404 then evaluates the suspected fraud attack in a step 5:3, to see if a new detection rule is motivated regarding subscriber S for the opposite network security function 402. In this example, the suspected fraud attack motivates a particular new detection rule for the network security function 400 to monitor communications with subscriber S, according to the mediating logic, and the new detection rule is set for function 400 in a next step 5:4.

In due course, the mediating function 404 receives a second alert in a step 5:5, this time coming from the network security function 400 and indicating an attack threat T involving subscriber S, since the previously modified alert criteria of function 400 have now been satisfied according to the new detection rule set in step 5:4.

The mediating function 404 then checks the threat database 406, in a further step 5:6, to see if the threat T indicated by the received second alert is known and to retrieve further information on the threat T. A following step 5:7 illustrates that the logic in the mediating function 404 analyses and evaluates the threat T, based on the outcome of step 5:6 among other things, in this example to see if an alarm to the security personnel is motivated. It is then decided that the threat motivates such an alarm that signals a potential network attack correlated with a suspected fraud related to service P. In this case, such an alarm is issued accordingly in a step 5:8.

Further, the mediating function 404 also decides that the alert criteria of fraud detection function 402 should be modified by setting a new detection rule for function 402, as shown in an optional step 5:9. In this example, the new detection rule is that all transactions related to service P shall trigger an alert from function 402.

The steps 4:4 and 5:7 above for evaluating an alert from the network security function 400, can be performed by the mediating function 404 in different possible ways. A more detailed procedure for performing this evaluation will now be described according to a first practical example, with reference to the flow chart in FIG. 6. It is thus assumed that prior to the procedure in FIG. 6, an alert has been received from the network security function 400 that indicates an attack threat "T" involving a certain user terminal, here simply referred to as a device "D", and that relevant information known about threat T has been retrieved from the threat database 406, as in steps 4:3 and 5:6 above. To simplify the figure, the network security function 400 is referred to as "NSF" and the fraud detection function 402 is referred to as "FDF".

In a first step 600, it is determined if the device D is already being specifically monitored by NSF, e.g. by D being present in a list of user terminals and/or subscribers which are monitored by NSF due to a previous suspected fraud indication for those subscribers/terminals. If so, it is further determined in a step 602 if threat T relates to Trojan activity involving illicitly installed malware in the device. If so, an alarm is issued in step 604 for suspected fraud according to threat T.

After step 604, or if the outcome of step 600 or step 602 is negative, a further step 606 is executed to determine if threat T is a <u>known</u> fraud-related threat, according to the checked database 406. If so, device D is monitored in FDF with respect to fraud, in a step 608, e.g. by adding D to a list of user terminals and/or subscribers which are monitored by FDF due to a previous known fraud attack on those subscribers/terminals.

On the other hand, if the outcome of step 606 is negative, a further step 610 is executed to determine if threat T is a <u>suspected</u> fraud-related threat, i.e. not determined to be known fraud-related according to information in database 406. This determination may be based on simple heuristics, e.g., suspect attacks on mobile terminals but ignore attacks on laptop computers.

If threat T is a suspected fraud-related threat, a new rule is set in FDF for D and its associated subscription in a step 612, to issue alerts when the subscription of D is charged for a premium service P. Typically, the FDF monitors both subscriptions (identified by a subscriber ID) and devices (identified by a device ID), the latter being primarily monitored for certain types of subscription fraud. In this step, D is thus also monitored in FDF with respect to suspected fraud attacks, e.g. by adding D to a list of user terminals and/or subscribers which are monitored by FDF due to suspected fraud attacks.

Another detailed procedure in the mediating function for handling an alert, this time received from the FDF, will now be described according to a second practical example, with reference to the flow chart in FIG. 7. In particular, the fraud attack indicated by the received alert will be investigated in view of malware in the device D in connection with using a particular service P. It is thus assumed that the mediating function has received an alert from the FDF related to fraud on device D when using service P, e.g. as in step 4:6 or step 5:2 in the cases described above. In this case, the received alert thus indicates a suspected threat of malware.

The procedure then begins by a first step 700 of determining if the device D has previously been attacked by malware, e.g. by D being present in a list of user terminals and/or subscribers which are monitored by FDF due to a previous fraud malware indication for those subscribers/terminals. If not, it is further determined in a step 702 if D is being monitored by the NSF in view of fraud based on network activity. If neither that is the case, a new rule is set in the NSF to monitor D for suspicious downloads related to malware, in a step 704. The process may then return to step 700 whenever another alert is received from the FDF.

On the other hand, if the outcome of determining step 702 is positive, i.e. D is already being monitored by the NSF, the combination of D and service P is monitored, in a step 706, in view of fraud alerts that can be correlated with the suspected threat of malware, basically to see if service P is "suspect". This may be done by adding a so-called "tuple" of D, P to a list of monitored device/service tuples associated with the suspected threat.

In a following step 708, an alarm may be issued for a particular service and the suspected threat of malware if the number of monitored D, P tuples with that service exceeds a predefined threshold. Hence, this implies that the service is now suspect as it has been linked to suspicious network activity in multiple instances. While the NSF could not conclusively determine a network attack, the link to service charges may warrant further manual investigation.

Returning to step 700, if the device D has actually been attacked by malware previously, i.e. when the outcome of step 700 is positive, an alarm is issued indicating that the previously attacked device D uses service P, in a step 710. In this step, service P is also added to a list of services that have been used by device D.

Then, in a further step 712, the list above with services used by D is analysed with respect to each service in the list, by determining the number of other devices which have also used that service. This can be done by determining the number of occurrences of that service in other device's corresponding lists of used services. If the number of such devices using the same service as D exceeds another predefined threshold, a new detection rule is set in the FDF for that service, in a step 714, e.g. by flagging the service as "suspect" or the like. For example, the latter rule may dictate that the FDF should issue an alert whenever the suspect service is used by a device, or by a preset number of devices.

Figure 4:
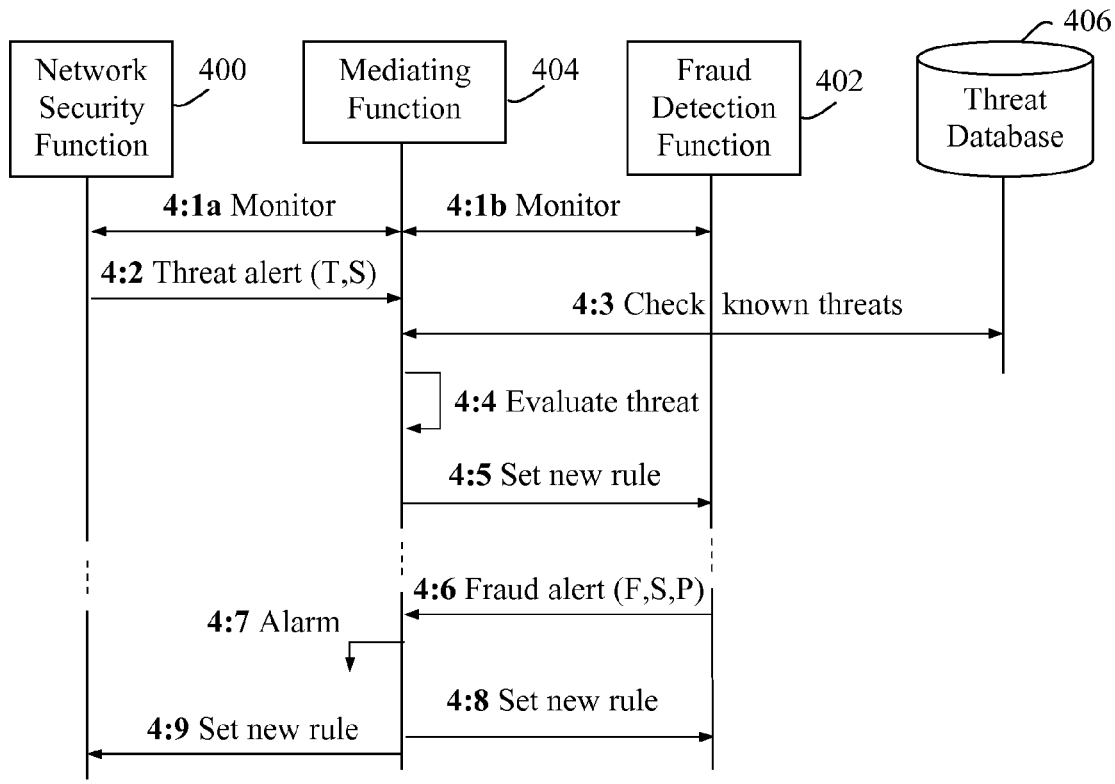
FIG. 4 is a first signalling diagram illustrating an exemplary procedure for supporting detection of fraud, in accordance with another embodiment.
Figure 5:
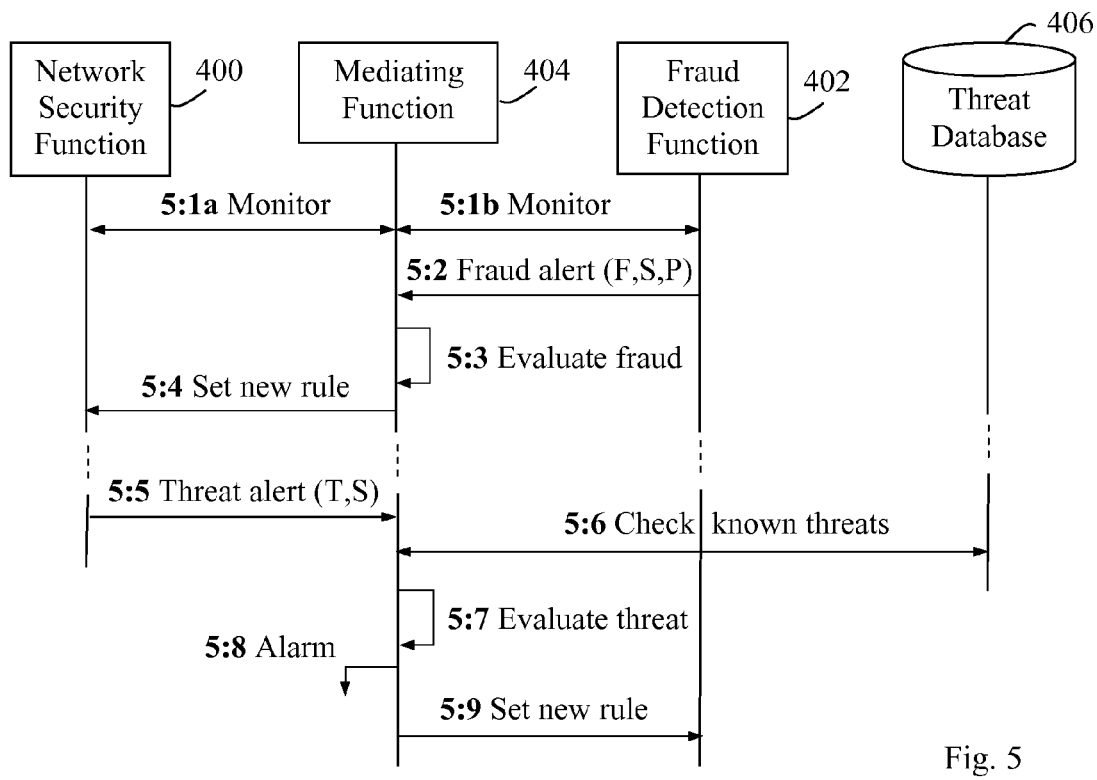
FIG. 5 is a second signalling diagram illustrating another exemplary procedure for supporting detection of fraud, in accordance with another embodiment.
Figure 6:
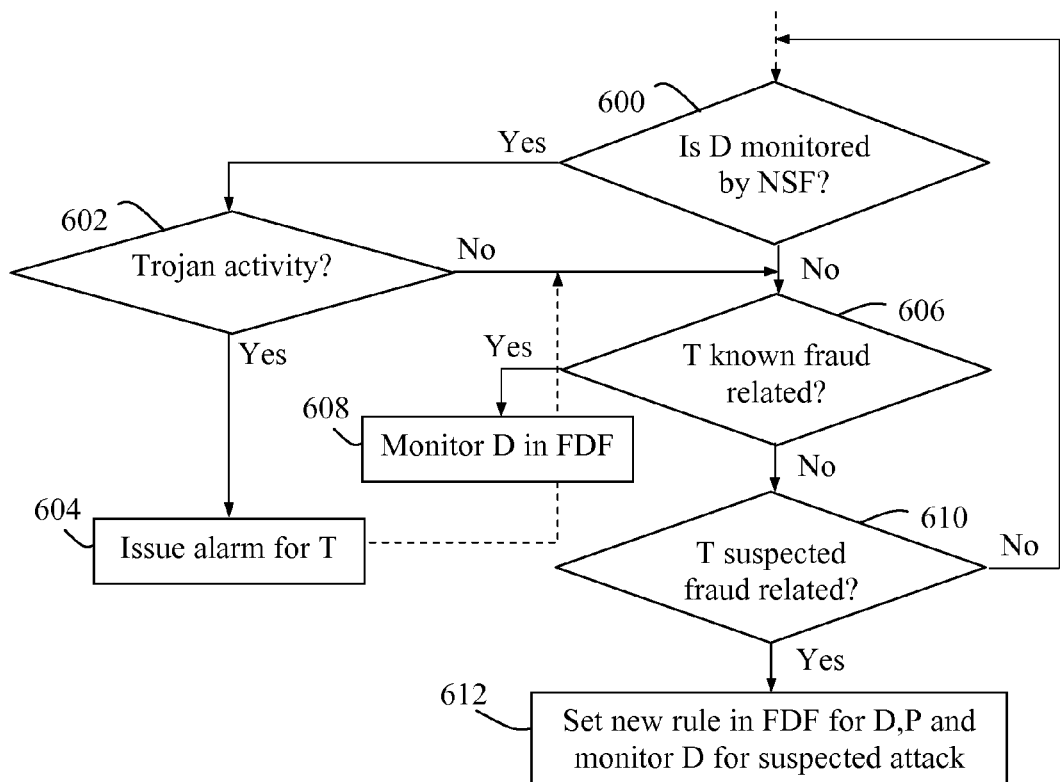
FIG. 6 is a flow chart illustrating a procedure executed by a mediating function according to a first practical example.
Figure 7:
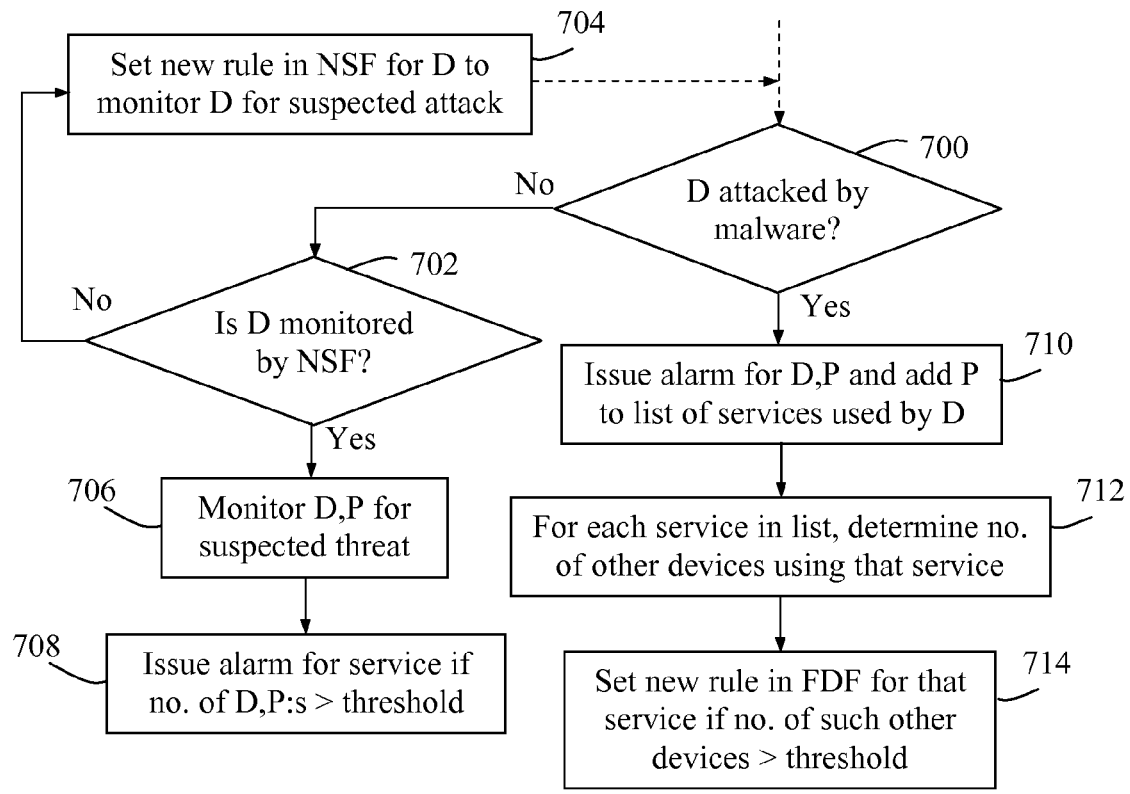
FIG. 7 is a flow chart illustrating a procedure executed by a mediating function according to a second practical example.

As mentioned above, it should be noted that one or both of the above exemplary logic processes according to FIG. 6 and FIG. 7 can thus be incorporated as a part of any of the procedures for supporting detection of fraud illustrated and described according to FIG. 4 and FIG. 5.

An apparatus in a mediating function will now be described in more detail with reference to the block diagram FIG. 8. The shown mediating function 800 is configured to support detection of fraud in a telecommunication network, not shown, when a network security function 802 is employed for analysing traffic and terminal activities in the network in view of a predefined alert criteria for detecting network and terminal attacks, and a fraud detection function 804 is employed for analysing information on users in the network, at least including charging information, in view of a predefined alert criteria for detecting fraud attacks. The fraud detection function may also analyse signalling information in view of fraud related activities.

The mediating function 800 comprises a monitoring unit 800a adapted to monitor the network security and fraud detection functions 802, 804 in view of any attack alerts A therefrom. The monitoring unit 800a is also adapted to receive a first alert A from a first one of the network security function and the fraud detection function, the first alert indicating that the predefined alert criteria in the first function has been satisfied. The mediating function 800 further comprises a modifying unit 800b adapted to modify the alert criteria AC in the second one of the network security function and fraud detection function, based on the received alert A.

Figure 8:
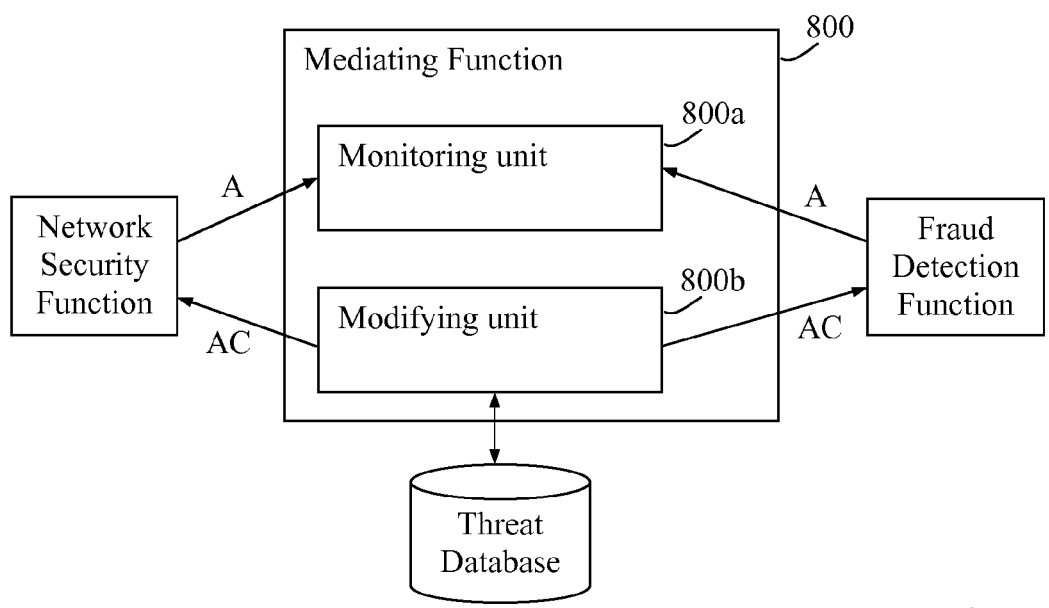
FIG. 8 is a block diagram illustrating a mediating function in more detail, in accordance with further possible embodiments.

It should be noted that FIG. 8 merely illustrates various functional units in the mediating function 800 in a logical sense, although the skilled person is free to implement these functions in practice using any suitable software and hardware means. Thus, the invention is generally not limited to the shown structure of the mediating function 800. The mediating function 800 and its functional units 800a and 800b may be further configured to operate according to the methods and procedures described above for FIGS. 2-7.

When using the solution according to any of the above-described embodiments, the process of correlating fraud investigations with suspected network attacks, or vice versa, can be automated, e.g., by starting from suspect charging patterns and tracking detailed network security information about a user or device potentially being defrauded. One or more of the following exemplary advantages may thus be accomplished:

Fraud activities that employ network attacks can be detected effectively, which would otherwise elude conventional network security systems and fraud detection systems when used in isolation, i.e. with no correlation as in the prior art.

Through rapid detection of which premium services are used for fraud activities employing network attacks, payments to those services could be stopped at an early stage and losses can thus be prevented.

The rapid detection of such network attack-based fraud incidents can also mitigate or even avoid negative subscriber experiences, and thus reduce the risk of customer complaints and general increase the credibility of the network and its operator.

While the invention has been described with reference to specific exemplary embodiments, the description is only intended to illustrate how this solution can be realised in practice and should not be taken as limiting the invention. For example, the terms "network security function" and "fraud detection function" have been used throughout this description, although any other corresponding functions, nodes and/or units may be used having the functionalities described here. The invention is generally defined by the following independent claims.

The invention claimed is:

1. A method of supporting fraud detection in a telecommunication network, the method being executed in an electronic device implementing a mediating function in the network, and comprising:
    the electronic device monitoring a network security function and a fraud detection function, wherein the network security function analyzes traffic and terminal activities in the network in view of predefined alert criteria for detecting network and terminal attacks, and wherein the fraud detection function analyzes charging information on users in the network in view of predefined alert criteria for detecting fraud attacks;
    the electronic device receiving a first alert from a first one of the network security function and the fraud detection function, the alert indicating that predefined alert criteria of its associated function have been satisfied; and
    the electronic device modifying alert criteria of a second one of the network security function and fraud detection function based on the received first alert;
    wherein modifying the alert criteria comprises:
        setting a new detection rule for the second one of the functions;
        adding a new alert triggering condition for the second one of the functions; or
        adding a new parameter to be monitored with respect to a predefined threshold for the second one of the functions.

2. The method of claim 1 wherein the second one of the functions is the network security function and the new detection rule dictates that an alert is issued upon detection of malware, spam, or communication with a notorious or suspect party or web site.

3. The method of claim 1 wherein the second one of the functions is the fraud detection function and the new detection rule dictates that an alert is to be issued upon detection of an abnormality in the charging pattern for one or more terminal users in the telecommunication network.

4. The method of claim 3 wherein the first alert is received from the network security function and is evaluated by checking known network threats in a threat database.

5. The method of claim 1 wherein the new detection rule indicates that an alert is to be issued upon detection of any activity related to a suspect service.

6. The method of claim 1 wherein the new detection rule is valid for a predefined period of time, after which the previous alert criteria are resumed.

7. The method of claim 1 wherein the new detection rule is valid for one or more specific terminal users.

8. The method of claim 1, further comprising:
    the electronic device receiving a second alert from the second one of the functions, indicating that the modified alert criteria of the second one of the functions have been satisfied; and
    the electronic device modifying the alert criteria of the first one of the functions based on the received second alert.

9. The method of claim 1 further comprising the electronic device issuing an alarm in response to one or more further alerts from either of the network security function or the fraud detection function.

10. The method of claim 1 wherein the electronic device comprises at least one network node or at least one user terminal.

11. An electronic device configured to implement a mediating function for supporting detection of fraud in a telecommunication network, the electronic device comprising:
    one or more processing circuits operating as the mediating function and configured to:
        monitor a network security function and a fraud detection function, wherein the network security function analyzes traffic and terminal activities in the network in view of predefined alert criteria for detecting network and terminal attacks, and the fraud detection function analyzes charging information on users in the network in view of predefined alert criteria for detecting fraud attacks;
        receive a first alert from a first one of the network security function and the fraud detection function, the first alert indicating that predefined alert criteria of its associated function have been satisfied; and
        modify the alert criteria of a second one of the network security function and fraud detection function, based on the received first alert;

wherein to modify the alert criteria, the one or more processing circuits are configured to:
set a new detection rule for the second one of the functions;
add a new alert triggering condition for the second one of the functions; or
add a new parameter to be monitored with respect to a predefined threshold for the second one of the functions.

12. The electronic device of claim 11 wherein the second one of the functions is the network security function and the new detection rule dictates that an alert is to be issued upon detection of malware, spam, or communication with a notorious or suspect party or web site.

13. The electronic device of claim 11 wherein the second one of the functions is the fraud detection function and the new detection rule dictates that an alert is to be issued upon detection of an abnormality in the charging pattern for one or more terminal users in the telecommunication network.

14. The electronic device of claim 13 wherein the first alert is received from the network security function, and wherein the one or more processing circuits are further configured to evaluate the first alert by checking known network threats in a threat database.

15. The electronic device of claim 11 wherein the new detection rule indicates that an alert is to be issued upon detection of any activity related to a suspect service.

16. The electronic device of claim 11 wherein the new detection rule is valid for a predefined period of time, after which the previous alert criteria are resumed.

17. The electronic device of claim 11 wherein the new detection rule is valid for one or more specific terminal users.

18. The electronic device of claim 11 wherein the one or more processing circuits are further configured to:
receive a second alert from the second one of the functions, indicating that the modified alert criteria of the second one of the functions have been satisfied; and
modify the alert criteria of the first one of the functions based on the received second alert.

19. The electronic device of claim 11 wherein the mediating function is configured to issue an alarm in response to one or more further alerts from either of the network security function or the fraud detection function.

20. The electronic device of claim 11 wherein the electronic device comprises at least one network node or at least one user terminal.

* * * * *